W. HOLT.
DYNAMO ELECTRIC MACHINE.
APPLICATION FILED NOV. 3, 1911.
1,100,567.
Patented June 16, 1914.
3 SHEETS—SHEET 1.
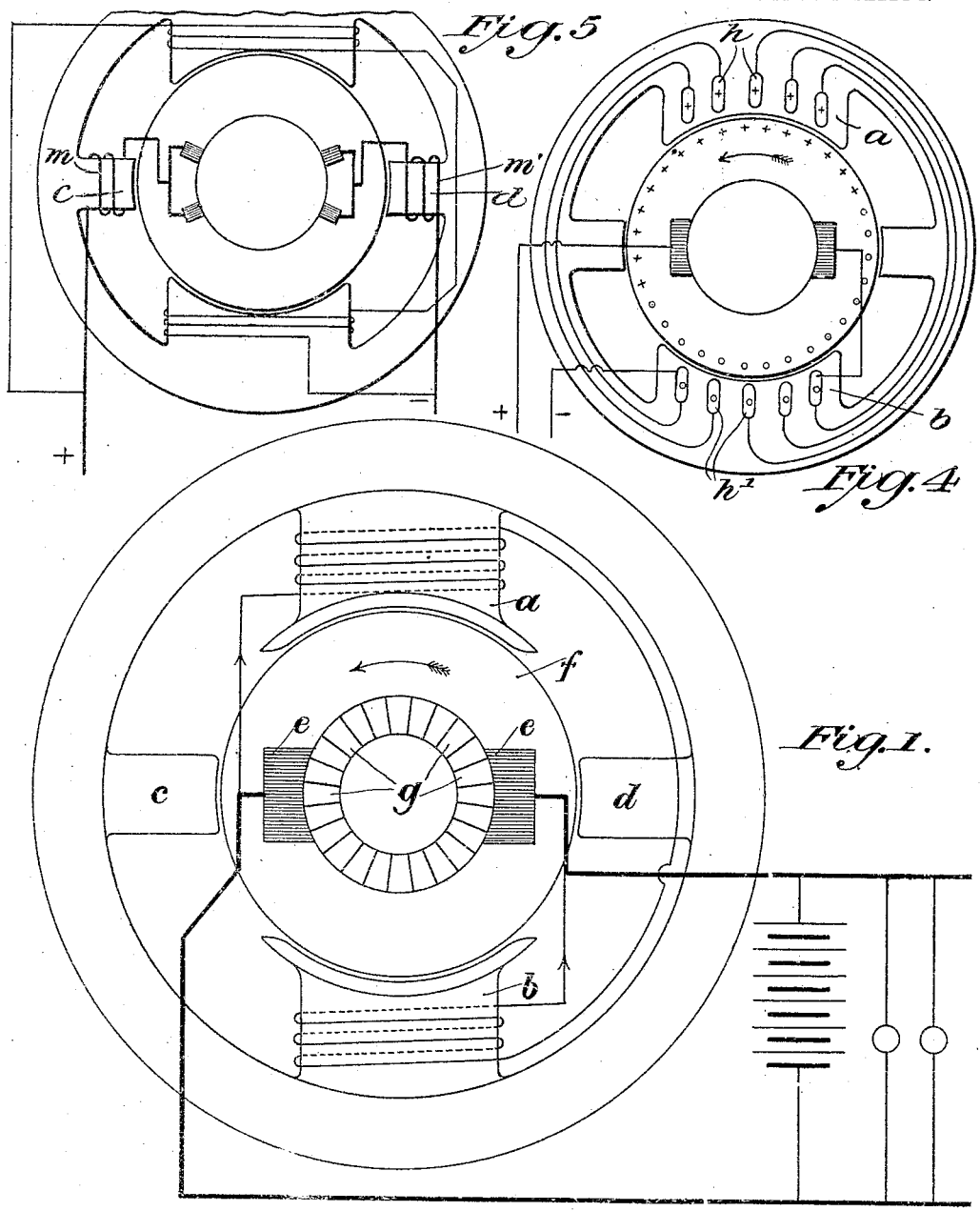
WITNESSES
INVENTOR William Holt W. HOLT.
DYNAMO ELECTRIC MACHINE.
APPLICATION FILED NOV. 3, 1911.
1,100,567.
Patented June 16, 1914.
3 SHEETS—SHEET 2.
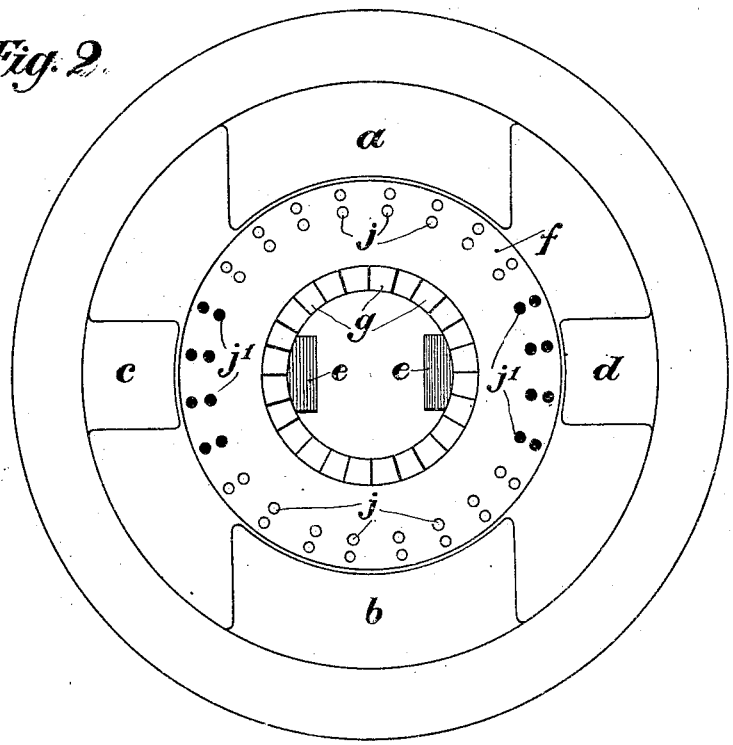
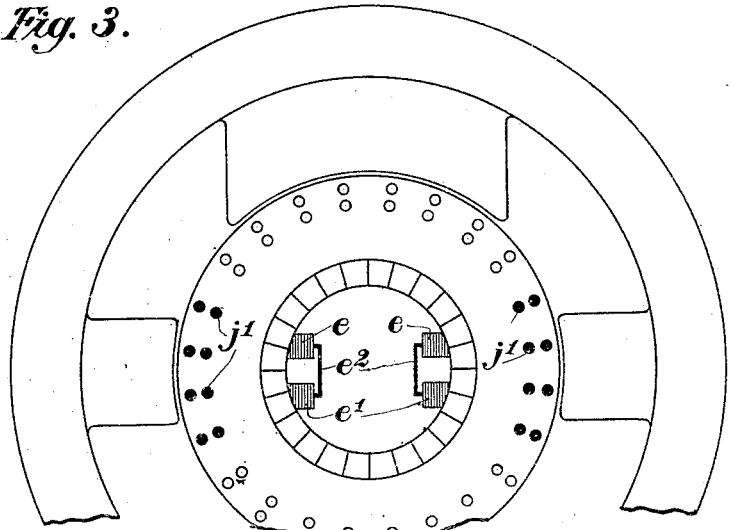

W. HOLT.
DYNAMO ELECTRIC MACHINE.
APPLICATION FILED NOV. 3, 1911.

1,100,567.

Patented June 16, 1914.
3 SHEETS—SHEET 3.

WITNESSES

INVENTOR William Holt

UNITED STATES PATENT OFFICE.

WILLIAM HOLT, OF ERDINGTON, BIRMINGHAM, ENGLAND.

DYNAMO-ELECTRIC MACHINE.

1,100,567. Specification of Letters Patent. Patented June 16, 1914.

Application filed November 3, 1911. Serial No. 658,411.

*To all whom it may concern:*

Be it known that I, WILLIAM HOLT, subject of the King of Great Britain, residing at 213 Slade road, Erdington, Birmingham, England, have invented certain new and useful Improvements in Dynamo-Electric Machines, of which the following is a specification.

This invention relates to dynamo-electric machines, particularly of that class which are run at variable speeds, such as those employed in connection with electric lighting systems of railway trains, motor vehicles, and the like, where the generator is driven directly from the axle, and supplies the current in conjunction with accumulators.

The object of the present invention is to provide an improved and more efficient means for rendering dynamo-electric machines substantially self-regulating and maintaining the current output practically constant over a wide variation of speed, or with a varying resistance connected across the terminals.

According to this invention the dynamo comprises means for producing a cross magnetic field independent of the main field, and armature brushes situated at the neutral positions of the armature which short-circuit armature coils under the influence of the cross field but outside the influence of the main field, and wherein a current is generated, distinct with relation to the working current, which sets up a field in opposition to the main field, and exerts a demagnetizing effect on the main poles, so preventing the voltage from rising when the speed increases, and maintaining a practically constant output.

Figure 6:
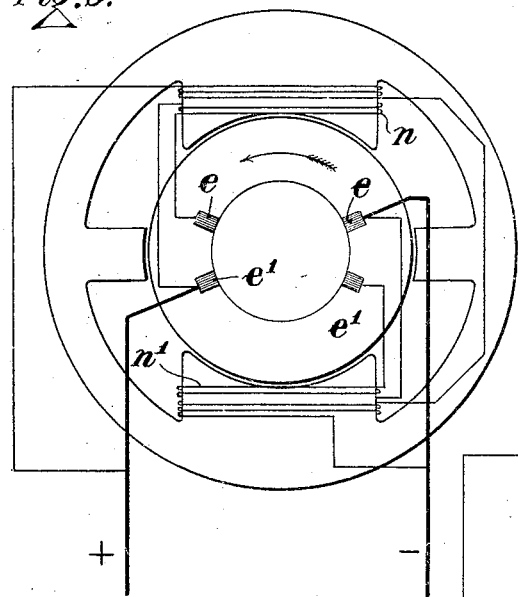
Figure 7:
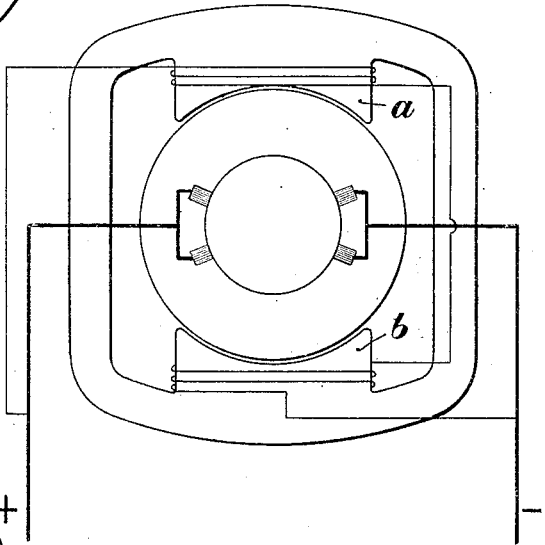
Figure 8:
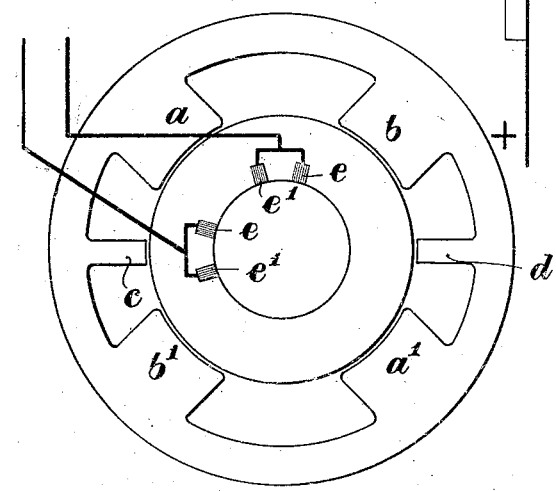

Figure 1 of the accompanying drawings represents diagrammatically a bi-polar machine embodying the present invention, and shows the wiring connection when the machine is used in a train-lighting or similar system. Fig. 2 is another diagrammatic view showing how certain of the armature conductors are short-circuited by the brushes. In this view the pole windings are omitted. Fig. 3 represents a modification in which the brushes are divided. Fig. 4 illustrates a modification in which auxiliary windings in the faces of the main poles are used for producing the cross field. Fig. 5 represents a modification in which series windings are provided on the auxiliary poles for producing the desired regulation. Fig. 6 is a view of another modification wherein the divided brushes are connected together through a demagnetizing winding on the main poles. Fig. 7 illustrates how the salient auxiliary poles can be dispensed with and the sides of the frame used instead. Fig. 8 shows a further modification in which the number of auxiliary poles employed is only half the number of main poles.

Referring to Figs. 1 and 2, the machine is fundamentally of the bi-polar type, having two main poles $a$, $b$, shunt wound (as shown) or compound wound, in the usual manner. Disposed mid-way between these main poles, at right angles to their axis, are a pair of auxiliary poles $c$, $d$, which may either be unwound (as represented) so as to be excited solely by the cross magnetization produced by the armature winding; or wound with a few series turns, so as to be excited directly by the current derived from the armature in addition to the said armature excitation; or the said poles may be excited in any other suitable manner. The single pair of brushes, $e$, $e$, of the armature $f$ (which latter may be of any ordinary type) are situated in the neutral position, relatively to the main poles, and have a sufficiently wide bearing surface to make simultaneous contact with a plurality of adjacent commutator segments $g$, so as to short-circuit certain of the armature coils which are least active, (shown in black section at $j^1$, Fig. 2). As the armature revolves the current generated in the active conductors $j$ produces a cross magnetic field having a direction at right angles to the main flux between the wound poles $a$, $b$. This cross flux traverses the auxiliary poles $c$, $d$, and thereby excites them, the excitation being further increased or decreased by the series or other windings, of the said poles, if such are employed. As the short-circuited armature coils $j^1$ move under the influence of the auxiliary poles, and cut the cross-flux passing between said poles, a current is generated in them having a direction such that a magnetic field is set up which directly opposes the main flux, and exerts a demagnetizing effect on the main wound poles. When the speed of the armature is increased, the current generated in the short-circuited armature coils $j^1$ rises approximately proportionally, thereby increasing the demagnetizing effect and weakening the effective field approximately in proportion to the increase in speed. By winding the auxiliary poles with a few series turns as herein referred to, any desired regulation may be obtained and it can be arranged for the output to slightly rise or to slightly fall with increased speed.

Instead of single wide brushes being employed as in Figs. 1 and 2, they may be divided into two parts, as in Fig. 3, where $e$, $e^1$, are the two said parts, which are electrically connected together at $e^2$ so as to short-circuit the desired number of armature conductors $j^1$.

In the modification shown by Fig. 3, the divided brushes $e$, $e^1$, may be connected together, as shown in Fig. 6, through a winding $n$, $n^1$ on the main poles $a$, $b$ arranged to demagnetize the latter, which is equivalent to increasing the number of the short-circuited armature turns.

Instead of the cross-field being produced solely by the working current in the armature, it may be wholly or partially produced as shown in Fig. 4, by series windings $h$, $h^1$, located in slots in the faces of the main poles $a$, $b$.

By winding the auxiliary poles $c$, $d$, as shown in Fig. 5, with a few series turns $m$ $m^1$ any desired regulation may be obtained, and it can be arranged for the output to slightly rise or to slightly fall with increase speed.

By arranging for a sufficiently strong cross magnetization the salient auxiliary poles may be dispensed with, as shown in Fig. 7, the sides of the magnet frame being used in their stead, and the cross flux being produced in the gap between the main poles $a$, $b$.

It is obvious that although the invention has been described in connection with a bipolar machine, yet the dynamo may have any number of main poles, the auxiliary poles being situated between each pair. Also instead of the auxiliary poles being equal in number to the main poles, they may be of only half that number, as represented in Fig. 8, where $a$, $a^1$, $b$, $b^1$ represent the main poles, and $c$, $d$, represent the auxiliary poles. The disposition of the sets of divided brushes $e$, $e^1$ is as shown.

Having now fully described my invention, what I desire to claim and secure by Letters Patent is:—

1. A dynamo electric machine comprising means for producing a main field, means for utilizing the cross-magnetization to produce a cross-flux, and armature brushes symmetrically situated about a line at right-angles to the line joining the main polar surfaces so as to short-circuit armature coils under the influence of the cross-flux but outside the influence of the main field, said short-circuited coils having generated in them a current distinct with relation to the working current which sets up a field in opposition to the main field and exerts a demagnetizing effect on the main poles.

2. A dynamo electric machine comprising main poles, auxiliary poles between said main poles and adapted to be excited by the cross-magnetization of the armature winding, and armature brushes which short-circuit a plurality of armature coils under the influence of the cross-flux but outside the influence of the main field, said short-circuited coils having generated in them a current, distinct with relation to the working current, which sets up a field in opposition to the main field so as to exert a demagnetizing effect on the main poles.

In testimony whereof I have hereunto set my hand in presence of two subscribing witnesses.

WILLIAM HOLT.

Witnesses:
HENRY SKERRETT,
HENRY NORTON SKERRETT.